United States Patent
O'Lenick, Jr. et al.

(10) Patent No.: US 6,747,116 B1
(45) Date of Patent: Jun. 8, 2004

(54) PHOSPHATED FLUORO ALKYL DIMETHICONE COPOLYOL ESTERS

(75) Inventors: Anthony J. O'Lenick, Jr., Dacula, GA (US); John Imperante, Somerville, NJ (US)

(73) Assignee: Phoenix Research Corporation, Somerville, NJ (US)

( * ) Notice: Subject to any disclaimer, the term of this patent is extended or adjusted under 35 U.S.C. 154(b) by 0 days.

(21) Appl. No.: 10/298,995

(22) Filed: Nov. 19, 2002

(51) Int. Cl.⁷ .................... C08G 77/24; C08G 77/30
(52) U.S. Cl. .............. 528/36; 528/26; 528/29; 528/31; 528/32; 528/41; 528/42; 525/474; 556/404; 556/445; 556/473
(58) Field of Search .............. 528/31, 32, 36, 528/41, 42, 46, 29, 26; 556/445, 473, 404; 525/474

(56) References Cited

U.S. PATENT DOCUMENTS

| | | | | |
|---|---|---|---|---|
| 5,446,114 A |   | 8/1995 | O'Lenick, Jr. | |
| 5,481,015 A | * | 1/1996 | Nomura | 556/405 |
| 6,087,517 A | * | 7/2000 | O'Lenick, Jr. | 556/405 |
| 6,175,028 B1 | * | 1/2001 | O'Lenick, Jr. | 556/405 |
| 6,245,924 B1 | * | 6/2001 | Imperante | 556/405 |
| 6,485,731 B2 | * | 11/2002 | Calello et al. | 424/401 |

* cited by examiner

*Primary Examiner*—Jeffrey B. Robertson

(57) ABSTRACT

The present invention relates to novel dimethicone copolyol phosphate ester compounds bearing a fluoro group attached through a hydrophobic ester linkage to silicon. This invention also relates a series of such products having differing amounts of water-soluble groups, silicone soluble groups and fatty soluble groups. By careful selection of the compounds so constructed, very efficient mild conditioning agents may be achieved.

16 Claims, No Drawings

PHOSPHATED FLUORO ALKYL DIMETHICONE COPOLYOL ESTERS

BACKGROUND OF THE INVENTION

1. Technical Field of the Invention

The present invention relates to novel phosphated fluoro dimethicone copolyol ester compounds in which the fluoro group is attached to the silicon atom through a fatty group, and the water-soluble group is connected to silicon through a different silicon atom. This invention also relates a series of such products having differing amounts of water-soluble groups, silicone soluble groups, fatty soluble groups and fluoro-soluble groups. By careful selection of the compounds so constructed, very efficient mild conditioning agents may be achieved.

2. Description of the Arts

There have been several fluoro silicone compounds disclosed in the art. They include U.S. Pat. No. 5,446,114 to O'Lenick issued August 1995. This patent teaches that "the compounds of the invention are prepared by reacting a silanic hydrogen containing silicone polymer with a vinyl containing fluoro compound and an allyl alcohol alkoxylate." This results in a molecule with two functional groups water soluble groups and fluoro groups, both independently linked to a different silicon atom.

U.S. Pat. No. 5,473,038 to O'Lenick issued December 1995 teaches that "compounds of the invention are prepared by reacting a silanic hydrogen containing silicone polymer with a vinyl containing fluoro compound alpha olefin". This results in a molecule with two functional groups alkyl groups and fluoro groups, both independently linked to a different silicon atom.

U.S. Pat. No. 6,087,517 to O'Lenick issued July 2000, teaches "the invention relates to a series of novel silicone fluorinated dimethicone copolyol phosphates. The compounds of the invention are prepared by reacting a fluoro dimethicone copolyol disclosed in U.S. Pat. No. 5,446,144 with a suitable phosphating agent." This invention introduces a phosphate group onto the hydroxyl functional group of the compounds of U.S. Pat. No. 5,446,144. This results in a molecule with two functional groups alkyl groups and fluoro groups, both independently linked to a different silicon atom.

U.S. Pat. No. 6,008,397 to O'Lenick, issued December 28, 1999, "discloses novel fluoro esters made by reacting (a) a carboxy silicone, and (b) the hydroxyl group of fluoro alcohol." The compounds of the '397 invention contain short linking groups derived from anhydrides and link the fluoro group through the water soluble group to one silicon atom.

We have surprisingly found that products made by the reaction of silicone methyl ester having 11 carbon atoms directly with the fluoro group, having a phosphated water soluble group containing polyoxyalkylene groups on another silicon atom results in an anionic fluoro-fatty silicone dimethicone copolyol phosphate. The compounds give unique emulsification properties with fluoro and fatty compounds or both, and have an outstanding gloss when applied lo the skin.

We have also surprisingly found that by having a bulky alkyl group linked to silicone, unique skin feel and conditioning properties result. The compounds of the prior art have the ester moiety linked through a water-soluble phosphated polyoxyalkylene group, resulting in a surface-active agent with different properties than the compounds of the present invention. The compounds linked through the polyoxyalkylene group are less efficient emulsifiers and do not provide the same degree of conditioning to the skin. The addition of the phosphate group results in unique emulsification and pigment dispersion properties.

SUMMARY OF THE INVENTION

The present invention is directed toward the provision of a series of novel silicone phosphate compounds that have a C-11 alkyl group linked to both a fluoro alcohol group and a silicon atom on opposite ends of the molecule. On one side the C-11 is linked through a carbon silicon bond and on the end of the C-11 group there is a fluoro alcohol linked through an ester group and to a silicon atom and ester groups linked through a hydrophobic group to silicon.

The water-soluble hydroxyl groups are likewise linked directly to another silicon group The compounds of the present invention have the formula:

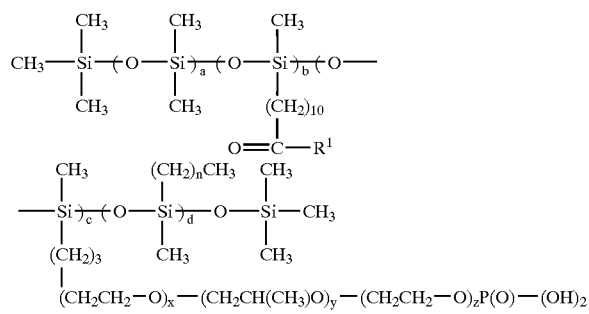

wherein;

a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20;
$R^1$ is

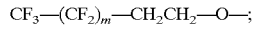

m is an integer ranging from 3 to 18.

DETAILED DESCRIPTION OF THE INVENTION

Objective of the Invention

It is the object of the present invention is the provision of a series of novel phosphated silicone compounds that have specific hydrophilic fluoro ester groups linked through an 11-carbon linkage directly to silicon.

Detailed Description of the Invention

The compounds of the present invention conform to the formula;

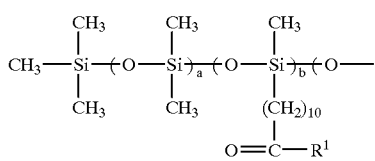

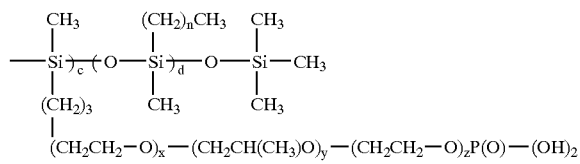

wherein;
a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20;

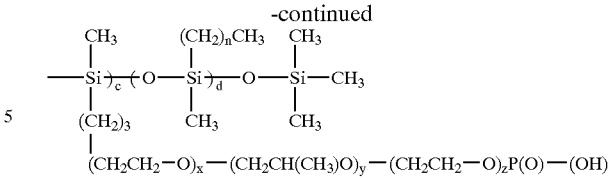

wherein:

a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20:

$R^1$ is

m is an integer ranging from 3 to 18.

An intermediate compound is prepared by the hydrosilyation reaction of a silicone polymer and specific alpha vinyl

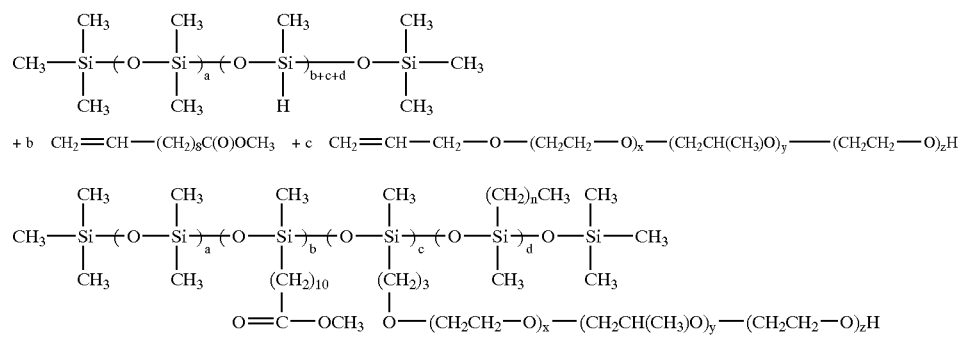

$R^1$ is

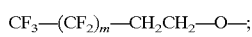

m is an integer ranging from 3 to 18.

The products are made by rearing fluoro duthicone copolyols with polyphosphoric acid to give the compounds of the present invention.

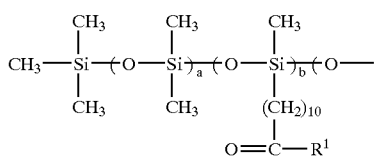

wherein:

a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;
y is an integer ranging 0 to 20;
z is an integer ranging 0 to 20.

The subsequent reaction is as follows;

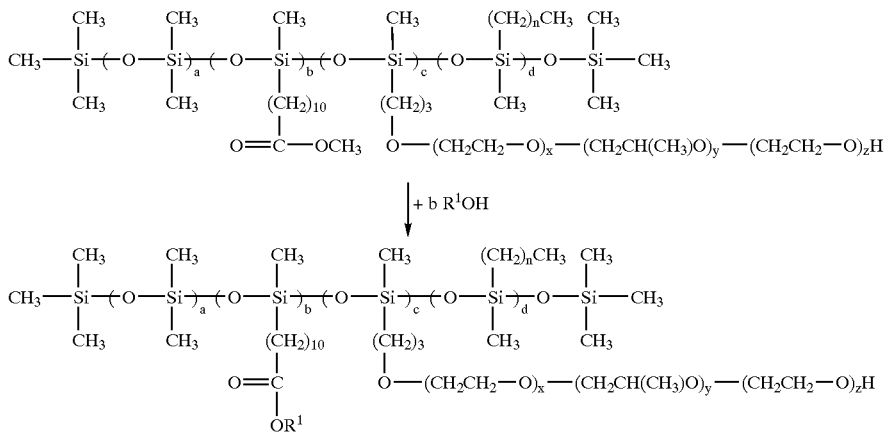

$R^1$ is $CF_3-(CF_2)_m-CH_2-O-$;

m is an integer ranging from 3 to 18.

Preferred Embodiments

In a preferred embodiment of the silicone polymer set d is 0.

In a preferred embodiment of the silicone polymer set d is an integer ranging from 1 to 20.

In a preferred embodiment of the silicone polymer set b in an integer ranging from 1 to 5.

In a preferred embodiment of the silicone polymer set b is an integer ranging from 6 to 20.

In a preferred embodiment of the silicone polymer set c is an integer ranging from 1 to 5.

In a preferred embodiment of the silicone polymer set c in an integer ranging from 6 to 20.

In a preferred embodiment of the silicone polymer set a is an integer ranging from 1 to 5.

In a preferred embodiment of the silicone polymer set a in an integer ranging from 6 to 20.

EXAMPLES

Raw Materials

Polymer Synthesis

Preparation of Silanic Hydrogen Containing Intermediates

Silicone intermediates of the type used to make the compounds of this invention are well known to those skilled in the art. International Publication (Silicone Alkylene Oxide Copolymers As Foam Control Agents) WO 86/0541 by Paul Austin (Sep. 25, 1986) p.16 (examples 1 to 6) teaches how to make the following intermediates, and is incorporated herein by reference.

Hydrosilylation

Silanic Hydrogen Containing Compounds (Comb Type)

The polymers used as raw materials are known to those skilled in the art and conform to the following structure:

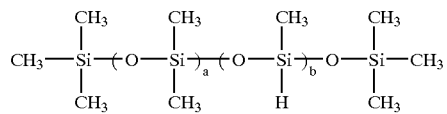

Compounds of this type are available from Siltech Corporation Toronto Ontario Canada.

| Example | Austin Example | a | b | Average Molecular Weight | Equivalent Molecular |
|---|---|---|---|---|---|
| 1 | 1 | 20 | 3 | 1,850 | 551 |
| 2 | 4 | 160 | 5 | 24,158 | 4,831 |
| 3 | 6 | 20 | 10 | 2,258 | 225 |

Compounds of this type are also available commercially from Siltech Corporation Toronto Ontario Canada. The structures were determined using silicone nmr and the chemistries were described using experimentally determined structures. Trade names are given merely for reference.

| Example | Siltech Name | a | b |
|---|---|---|---|
| 4 | Siltech D-116 | 9 | 4 |
| 5 | Siltech H-345 | 22 | 5 |
| 6 | Siltech C-106 | 50 | 10 |
| 7 | Siltech ZZ-302 | 70 | 20 |
| 8 | Siltech XX-456 | 50 | 60 |
| 9 | Siltech J-456 | 10 | 20 |
| 10 | Siltech G-456 | 0 | 60 |

2. Methyl Undecylenate

Example 11

Methyl undecylenate is an item of commerce and conforms to the following structure:

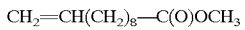

As previously stated, the reaction requires the reaction of an ester, not the acid directly. The reason for this is that is the reaction is conducted using undecylenic acid the acid group reacts with the Si-H and does not give the desired product. This is a critical unappreciated step in the practice of this technology.

3. Alkoxylated Allyl Alcohols

Alkoxylated allyl alcohol conforms to the following structure:

$$CH_2=CH-CH_2-(CH_2-CH_2-O)_x-(CH_2CHCH_3O)_yH$$

wherein x and y are integers independently ranging from 0 to 20.

Compounds of this of this type are also available commercially from Siltech Corporation Toronto Ontario Canada. The structures were determine using carbon nmr and wet analysis. The chemistries were described using experimentally determined structures. Trade names are given merely for reference.

| Example | x | y |
|---------|---|---|
| 12 | 0 | 0 |
| 13 | 8 | 0 |
| 14 | 20 | 20 |
| 15 | 16 | 8 |
| 16 | 5 | 5 |
| 17 | 25 | 25 |
| 18 | 12 | 6 |
| 19 | 9 | 9 |
| 20 | 0 | 9 |

4. Alpha Olefin

Alpha olefin are items of commerce and are available from a variety of sources including Chevron. They conform to the following structure:

$$CH_2=CH-(CH_2)_5CH_3$$

s is an integer ranging from 3 to 50 and is equal to n-2.

| Example | s |
|---------|---|
| 21 | 8 |
| 22 | 10 |
| 23 | 12 |
| 24 | 14 |
| 25 | 18 |

Hydrosilylation

The hydrosilylation reaction used to make the compounds of this invention is well known to those skilled in the art. One of many references is International Publication (Silicone Alkylene Oxide Copolymers As Foam Control Agents ) WO 86/0541 by Paul Austin (Sep. 25, 1986) p.19.

General Reaction Process (Hydrosilylation)

To a suitable flask fitted with a mechanical agitator, thermometer with a Therm-o-watch temperature regulator, nitrogen sparge tube vented reflux condenser and heating mantle is added the specified quantity of methyl undecylenate (example 11), allyl alcohol alkoxylates (examples 12–20), and alpha olefin (examples $21_{14\ 25}$) examples. Next is added the specified number of grams of the specified hydrosilylation intermediate (Example # 1–10) and isopropanol. The temperature is increased to 85 C and 3.5 ml of 3% $H_2PtCl_6$ in ethanol is added. An exotherm is noted to about 95 C, while the contents are stirred for about 2 hours. During this time silanic hydrogen concentration drops to nil. Cool to 65 C and slowly add 60 g of sodium bicarbonate. Allow to mix overnight and filter through a 4-micron pad. Distill off any solvent at 100 C and 1 torr.

Example 26

To a suitable flask fitted with a mechanical agitator, thermometer with a Therm-o-watch temperature regulator, nitrogen sparge tube vented reflux condenser and heating mantle is added 200.0 grams of methyl undecylenate (example 11), 915.4 grams of allyl alcohol alkoxylate (example 16), 1687.7 grams of hydrosilylation intermediate (Example # 15) and 750 grams of isopropanol. Heat to 85 C and add 3.5 ml of 3 % H 2 PtCl 6 in ethanol. An exotherm is noted to about 95 C, while the contents are stirred for about 2 hours. During this time silanic hydrogen concentration drops to nil. Cool to 65 C and slowly add 60 g of sodium bicarbonate. Allow to mix overnight and filter through a 4-micron pad. Distill off any solvent at 100 C and 1 torr.

|  | Silanic Polymer | | Example 11 | Allyl Alkoxylate | | Alpha Olfein | |
|---------|---------|--------|--------|---------|--------|---------|--------|
| Example | Example | Grams  | Grams  | Example | Grams  | Example | Grams  |
| 26 | 1  | 2600.8 | 281.0 | 12 | 165.2  | 21 | 0 |
| 27 | 2  | 2617.0 | 42.0  | 13 | 348.1  | 21 | 0 |
| 28 | 3  | 497.1  | 218.0 | 14 | 2321.2 | 21 | 0 |
| 29 | 4  | 703.4  | 129.5 | 15 | 2188.6 | 21 | 0 |
| 30 | 5  | 1522.5 | 286.4 | 16 | 1238.7 | 21 | 0 |
| 31 | 6  | 522.7  | 46.1  | 17 | 2438.9 | 21 | 0 |
| 32 | 7  | 423.0  | 63.6  | 18 | 2524.0 | 21 | 0 |
| 33 | 8  | 387.3  | 102.1 | 19 | 2527.6 | 21 | 0 |
| 34 | 9  | 543.5  | 254.2 | 20 | 2244.7 | 21 | 0 |
| 35 | 10 | 1360.6 | 710.0 | 12 | 1046.6 | 21 | 0 |
| 36 | 1  | 2064.2 | 222.7 | 13 | 463.5  | 21 | 286.6 |
| 37 | 2  | 1942.5 | 31.1  | 14 | 991.7  | 22 | 39.9 |
| 38 | 3  | 691.9  | 121.3 | 15 | 2050.9 | 23 | 156.1 |
| 39 | 4  | 1223.6 | 225.2 | 16 | 1298.7 | 24 | 289.8 |
| 40 | 5  | 607.9  | 57.2  | 17 | 2270.9 | 25 | 73.6 |

-continued

| | Silanic Polymer | | Example 11 | Allyl Alkoxylate | | Alpha Olfein | |
|---|---|---|---|---|---|---|---|
| Example | Example | Grams | Grams | Example | Grams | Example | Grams |
| 41 | 6 | 1229.4 | 108.4 | 18 | 1540.8 | 21 | 139.4 |
| 42 | 7 | 886.1 | 80.0 | 19 | 1978.8 | 22 | 68.5 |
| 43 | 8 | 581.7 | 77.0 | 20 | 2255.8 | 23 | 98.6 |
| 44 | 9 | 1589.3 | 445.5 | 12 | 656.4 | 24 | 382.5 |
| 45 | 10 | 429.1 | 112.1 | 13 | 2333.2 | 25 | 144.3 |
| 46 | 1 | 1261.7 | 136.2 | 14 | 1449.7 | 21 | 175.2 |
| 47 | 2 | 2430.1 | 39.0 | 15 | 437.6 | 22 | 99.9 |
| 48 | 3 | 1038.5 | 182.2 | 16 | 1575.3 | 23 | 234.4 |
| 49 | 4 | 478.9 | 88.2 | 17 | 2334.1 | 24 | 113.4 |
| 50 | 5 | 1182.4 | 111.2 | 18 | 1581.8 | 25 | 143.1 |
| 51 | 6 | 1201.7 | 105.0 | 19 | 1573.8 | 21 | 136.3 |
| 52 | 7 | 1209.9 | 109.8 | 20 | 1605.6 | 22 | 93.6 |
| 53 | 8 | 1799.5 | 237.1 | 12 | 697.9 | 23 | 305.0 |
| 54 | 9 | 665.1 | 124.4 | 13 | 2071.2 | 24 | 160.1 |
| 55 | 10 | 123.1 | 64.3 | 14 | 2740.5 | 25 | 82.8 |
| 56 | 4 | 1066.0 | 197.0 | 13 | 1228.0 | 21 | 0 |
| 57 | 4 | 534.0 | 197.0 | 13 | 409.0 | 21 | 0 |
| 58 | 4 | 355.0 | 197.0 | 13 | 136.0 | 21 | 0 |

Ester Preparation of Examples 26–58

The compounds made in examples 26–58 are methyl esters as prepared. They are reacted with fatty alcohols to produce the ester of the present invention. The reaction is as follows;

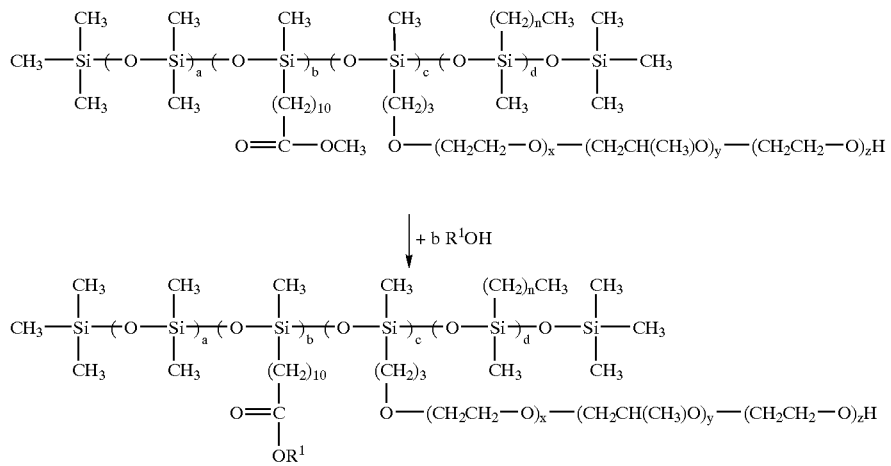

Raw Material Fluoro Alcohols

Fluoro Alcohols

Fluorine containing alcohols are commercially available from a variety of suppliers, most importantly Hoeschst Celanese and DuPonte Performance Products Division. They conform to the following structure;

$CF_3-(CF_2)_m CH_2 CH_2 OH$

| Reactant Example Number | m Value |
|---|---|
| 1 | 3 |
| 2 | 5 |
| 3 | 7 |
| 4 | 9 |

-continued

| Reactant Example Number | m Value |
|---|---|
| 5 | 11 |
| 6 | 13 |
| 7 | 15 |
| 8 | 17 |

Example 59–91

In a suitable reaction flask equipped with a thermometer, heating mantle, and a condenser to remove methanol is added the specified amount of the specified silicone methyl ester is added the specified number grams of the specified alcohol (Examples Raw Material Example 1-Raw Material Example 8). The reaction mass is heated to 190 to 200° C.

The reaction begins at about 170° C. Allow the methanol to distill off as the reaction proceeds. After the reaction progress is followed by hydroxyl value which meets theoretical within 12 hours.

| | Methyl Ester | | Raw Material Alcohols | |
|---|---|---|---|---|
| | | | Raw Material Example | |
| Example | Example | Grams | Number | Grams |
| 59 | 26 | 3047.0 | 1 | 264.0 |
| 60 | 27 | 3007.1 | 2 | 364.0 |
| 61 | 28 | 947.2 | 3 | 464.0 |
| 62 | 29 | 3021.5 | 4 | 564.0 |
| 63 | 30 | 3047.6 | 5 | 664.0 |
| 64 | 31 | 3007.7 | 6 | 764.0 |
| 65 | 32 | 3028.6 | 7 | 864.0 |
| 66 | 33 | 3016.4 | 8 | 964.0 |
| 67 | 34 | 3042.4 | 1 | 280.0 |
| 68 | 35 | 3117.2 | 2 | 380.0 |
| 69 | 36 | 3038.0 | 3 | 480.0 |
| 70 | 37 | 3005.3 | 4 | 580.0 |
| 71 | 38 | 3020.1 | 5 | 680.0 |
| 72 | 39 | 3037.6 | 6 | 780.0 |
| 73 | 40 | 3008.1 | 7 | 880.0 |
| 74 | 41 | 3017.8 | 8 | 980.0 |
| 75 | 42 | 3013.1 | 7 | 864.0 |
| 76 | 43 | 3012.7 | 6 | 764.0 |
| 77 | 44 | 3072.8 | 5 | 664.0 |
| 78 | 45 | 3018.2 | 4 | 564.0 |
| 79 | 46 | 3020.0 | 3 | 464.0 |
| 80 | 47 | 819.0 | 2 | 364.0 |
| 81 | 48 | 3029.7 | 1 | 264.0 |
| 82 | 49 | 3014.0 | 8 | 1000.0 |
| 83 | 50 | 3018.6 | 7 | 900.0 |
| 84 | 51 | 3106.7 | 6 | 800.0 |
| 85 | 52 | 3018.0 | 5 | 700.0 |
| 86 | 53 | 3038.6 | 4 | 600.0 |
| 87 | 54 | 3020.0 | 3 | 500.0 |
| 88 | 55 | 3010.5 | 6 | 774.0 |
| 89 | 56 | 2492.0 | 5 | 664.0 |
| 90 | 57 | 1140.0 | 4 | 564.0 |
| 91 | 58 | 688.0 | 3 | 464.0 |

Phosphation

The entire amount of compounds from example 59–91 are phosphated using 98 grams of polyphosphoric acid. Polyphosphoric acid is an item of commerce and is often referred to as polyphosphoric acid or PPA.

The reaction product of examples 59–91 are warmed to 80–90° C. and 98 grams of polyphosphoric acid is added under good agitation. The temperature exotherms to 95–100° C. The temperature is held for 4 hours at 90–100° C. The product is cooled and used without additional purification.

Applications Examples

The compounds of the present invention are clear liquids when molten. Some are liquid at ambient temperatures, others are waxy solids, depending upon the raw materials used for reaction. They make very thin films when applied to substrates including fiber, hair and skin. They arc highly lubricious, and outstanding emulsifiers.

The compounds of the present invention arc very substantive to substrates like hair, skin and fiber. They provide a highly lubricious coating to these substrates. This suggests their use in personal care products like make up and other pigmented products. The compounds will also help disperse pigment and consequently can added to the pigment grind to make uniform particles.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the allowing claims, including equivalents thereof.

What is claimed:

1. A silicone polymer conform to the following structure:

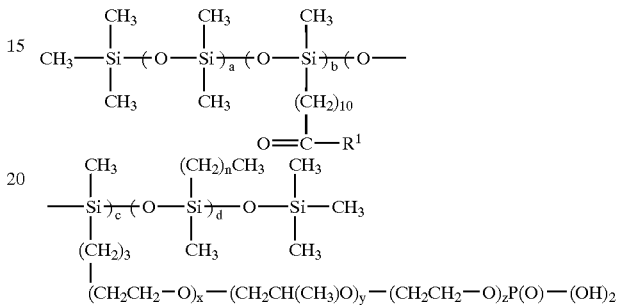

wherein;

a is an integer ranging from 0 to 2000;

b is an integer ranging from 1 to 20;

c is an integer ranging from 1 to 20;

d is an integer ranging from 0 to 20;

n is an integer ranging from 10 to 20;

x is an integer ranging from 0 to 20;

y is an integer ranging from 0 to 20;

z is an integer ranging from 0 to 20;

$R^1$ is

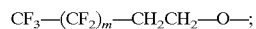

m is an integer ranging from 3 to 18.

2. A silicone polymer of claim 1 wherein d is 0.
3. A silicone polymer of claim 1 wherein d in an integer ranging from 1 to 5.
4. A silicone polymer of claim 1 wherein b is an integer ranging from 6 to 20.
5. A silicone polymer of claim 1 wherein c is an integer ranging from 1 to 5.
6. A silicone polymer of claim 1 wherein c in an integer ranging from 6 to 20.
7. A silicone polymer of claim 1 wherein s is an integer ranging from 1 to 5.
8. A silicone polymer of claim 1 wherein s in an integer ranging from 6 to 20.
9. A silicone polymer of claim 1 wherein m is 3.
10. A silicone polymer of claim 1 wherein m is 5.
11. A silicone polymer of claim 1 wherein m is 7.
12. A silicone polymer of claim 1 wherein m is 9.
13. A silicone polymer of claim 1 wherein m is 11.
14. A silicone polymer of claim 1 wherein m is 13.
15. A silicone polymer of claim 1 m is 15.
16. A silicone polymer of claim 1 m is 17.

* * * * *